(12) United States Patent
Hubbard et al.

(10) Patent No.: US 8,839,911 B2
(45) Date of Patent: Sep. 23, 2014

(54) ELEVATOR MACHINE FRAME WITH NOISE REDUCING CONFIGURATION

(75) Inventors: James L. Hubbard, Kensington, CT (US); Stephen R. Nichols, Unionville, CT (US); Bruce W. Horne, Cromwell, CT (US); Zbigniew Piech, Cheshire, CT (US); Arthur Blanc, Glastonbury, CT (US)

(73) Assignee: Otis Elevator Company, Farmington, CT (US)

( * ) Notice: Subject to any disclaimer, the term of this patent is extended or adjusted under 35 U.S.C. 154(b) by 272 days.

(21) Appl. No.: 13/257,467

(22) PCT Filed: Apr. 28, 2009

(86) PCT No.: PCT/US2009/041889
§ 371 (c)(1),
(2), (4) Date: Sep. 19, 2011

(87) PCT Pub. No.: WO2010/126484
PCT Pub. Date: Nov. 4, 2010

(65) Prior Publication Data
US 2012/0006969 A1    Jan. 12, 2012

(51) Int. Cl.
B66B 11/08    (2006.01)
B66D 1/00    (2006.01)
H02K 5/24    (2006.01)
B66B 11/04    (2006.01)

(52) U.S. Cl.
CPC .................................. B66B 11/043 (2013.01)
USPC ............................. 187/254; 254/266; 310/51

(58) Field of Classification Search
USPC ............. 187/254; 254/266, 323, 901; 310/51, 310/156.26, 156.74, 156.76, 156.77
See application file for complete search history.

(56) References Cited

U.S. PATENT DOCUMENTS

| 1,814,154 | A | * | 7/1931 | Hartley .......................... 417/319 |
| 4,736,929 | A | * | 4/1988 | McMorris ....................... 254/344 |
| 5,037,586 | A | * | 8/1991 | Mehrholz et al. ............. 261/142 |
| 5,052,547 | A | * | 10/1991 | Doi ................................ 198/806 |

(Continued)

FOREIGN PATENT DOCUMENTS

| EP | 1333000 A1 | 8/2003 |
| EP | 1380530 A1 | 1/2004 |

(Continued)

OTHER PUBLICATIONS

International Search Report and Written Opinion of the International Searching Authority for International application No. PCT/US2009/041889 mailed Jan. 27, 2010.

(Continued)

*Primary Examiner* — William E Dondero
*Assistant Examiner* — Minh Truong
(74) *Attorney, Agent, or Firm* — Carlson, Gaskey & Olds

(57) ABSTRACT

An exemplary elevator machine frame includes a plurality of support surfaces configured to support at least one of a motor or a brake. A plurality of arms between the support surfaces maintain a desired alignment of support surfaces. At least one of the arms has a first cross section taken transverse to a longitudinal direction along a length of the arm at a first longitudinal location on the arm. That same arm has a second, different cross section at a second, different longitudinal location on the arm.

13 Claims, 4 Drawing Sheets

(56) References Cited

U.S. PATENT DOCUMENTS

| | | | |
|---|---|---|---|
| 6,601,828 B2 * | 8/2003 | Strbuncelj et al. | 254/266 |
| 6,631,886 B1 * | 10/2003 | Caudle et al. | 254/327 |
| 6,663,086 B2 * | 12/2003 | Huang | 254/344 |
| 7,000,904 B2 * | 2/2006 | Huang | 254/323 |
| 7,165,653 B2 | 1/2007 | Rennataud | |
| 2003/0230744 A1 * | 12/2003 | Rawlinson | 254/323 |
| 2004/0104079 A1 | 6/2004 | Fischer | |
| 2004/0108170 A1 | 6/2004 | Kocher et al. | |
| 2006/0144642 A1 | 7/2006 | del Rio et al. | |
| 2006/0151251 A1 | 7/2006 | Rennataud | |
| 2006/0163009 A1 | 7/2006 | Ishii et al. | |
| 2009/0261311 A1 * | 10/2009 | Mann | 254/279 |
| 2010/0288906 A1 * | 11/2010 | Piech | 248/636 |
| 2013/0048929 A1 * | 2/2013 | Starks et al. | 254/362 |

FOREIGN PATENT DOCUMENTS

| | | |
|---|---|---|
| EP | 1400479 B1 | 3/2004 |
| EP | 1698580 A1 | 9/2006 |
| EP | 1698581 A1 | 9/2006 |
| JP | 2006052076 A | 2/2006 |

OTHER PUBLICATIONS

International Preliminary Report on Patentability for International application No. PCT/US2009/041889 mailed Nov. 10, 2011.

State Intellectual Property Office of People's Republic China, Search Report for Application No. 200980159060.5 dated Apr. 18, 2013.

* cited by examiner

ELEVATOR MACHINE FRAME WITH NOISE REDUCING CONFIGURATION

BACKGROUND

Elevator systems typically include a machine that moves the elevator car to provide requested elevator service. In traction-based elevator systems, the machine includes a motor and a brake. The motor causes a traction sheave to rotate to move the elevator car. The brake prevents the traction sheave from rotating when the elevator car should remain parked at a landing. There are known techniques to control the motor and brake operation to achieve desired elevator system operation.

The elevator machine had for many years been situated in a machine room above the hoistway. A modern trend in elevator system design is to eliminate the machine room and support the machine in the hoistway. Various approaches have been developed to accomplish that.

One advantage of a machine roomless elevator system is that it requires less building space. One disadvantage is that the machine is now in the hoistway so that any noise associated with machine operation is more likely to be noticeable to passengers in the elevator car. Quiet and smooth operation is desired to provide a desired ride quality. There are challenges associated with maintaining sufficiently low noise levels in machine roomless elevator systems.

The way in which an elevator machine is supported in the hoistway can be a contributor to the noise introduced into the hoistway. The way in which a machine is supported can effectively increase the noise by radiating sound and producing tonal noise that is noticeable to passengers. Some machine frames, which are designed with sufficient structural integrity to support the loads associated with the machine, tend to increase audible noise as the supporting structures radiate sound associated with machine operation.

Example machine frames are shown in the United States Patent Application Publication No. 2006/051251 and the published European Patent Application No. EP 1698581. Those skilled in the art are always striving to make improvements in elevator systems including providing quieter system operation.

SUMMARY

An exemplary elevator machine frame includes a plurality of support surfaces configured to support at least one of a motor or a brake. A plurality of arms between the support surfaces maintain a desired alignment of support surfaces. At least one of the arms has a first cross section taken transverse to a longitudinal direction along a length of the arm at a first longitudinal location on the arm. That same arm has a second, different cross section at a second, different longitudinal location on the arm.

An exemplary elevator machine assembly includes a machine, a brake and a traction sheave that is selectively moved by the motor and selectively prevented from moving by the brake. A machine frame includes support surfaces that support the motor and the brake with the traction sheave between the support surfaces. A plurality of arms between the support surfaces are longitudinally aligned with an axis of rotation of the traction sheave. One of the arms is positioned on one side of the traction sheave and at least partially in a vertical plane that includes the traction sheave axis of rotation. Two of the arms are positioned on an opposite side of the traction sheave and spaced apart so that both are outside of the vertical plane.

The various features and advantages of the disclosed examples will become apparent to those skilled in the art from the following detailed description. The drawings that accompany the detailed description can be briefly described as follows.

DETAILED DESCRIPTION

Figure 1:
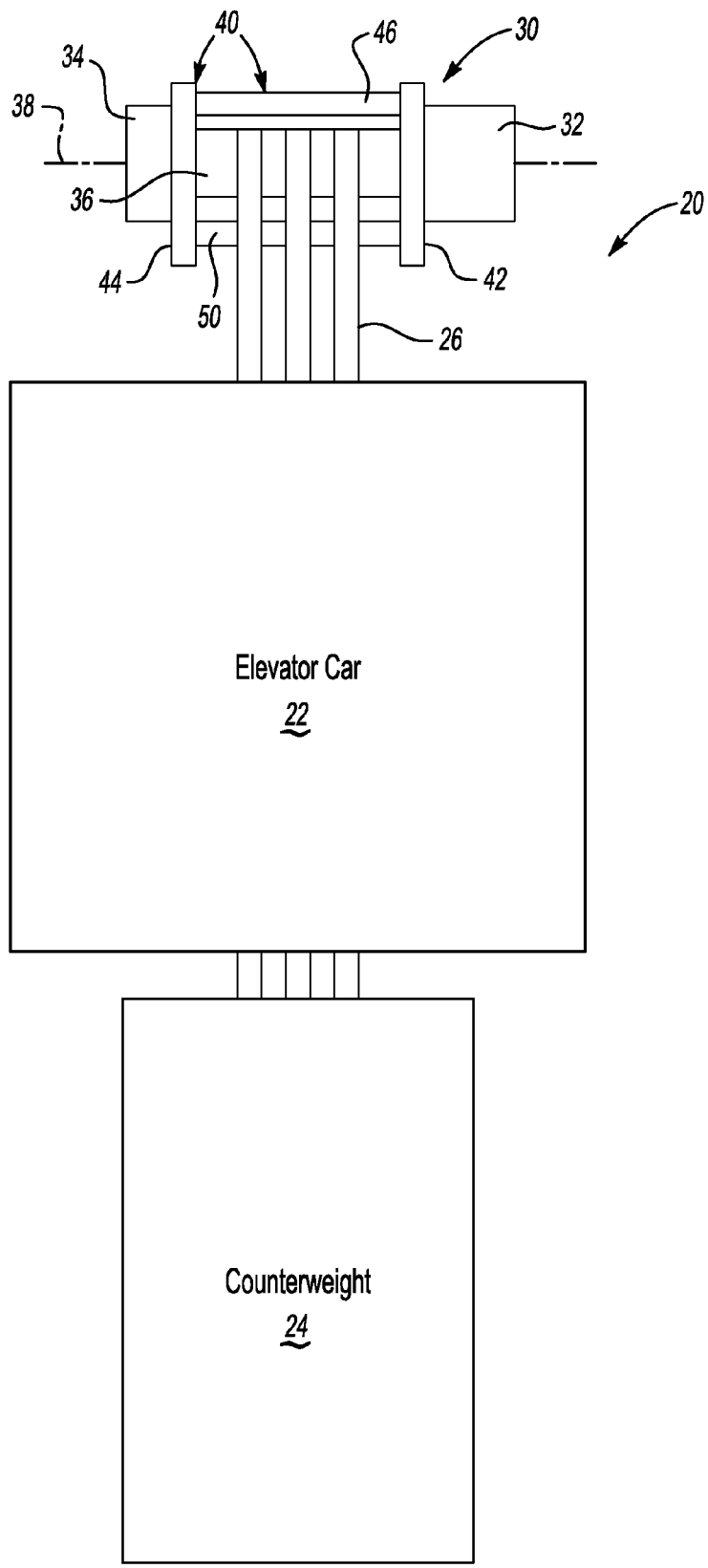
FIG. 1 schematically illustrates selected portions of an elevator system incorporating an embodiment of this invention.
Figure 2:
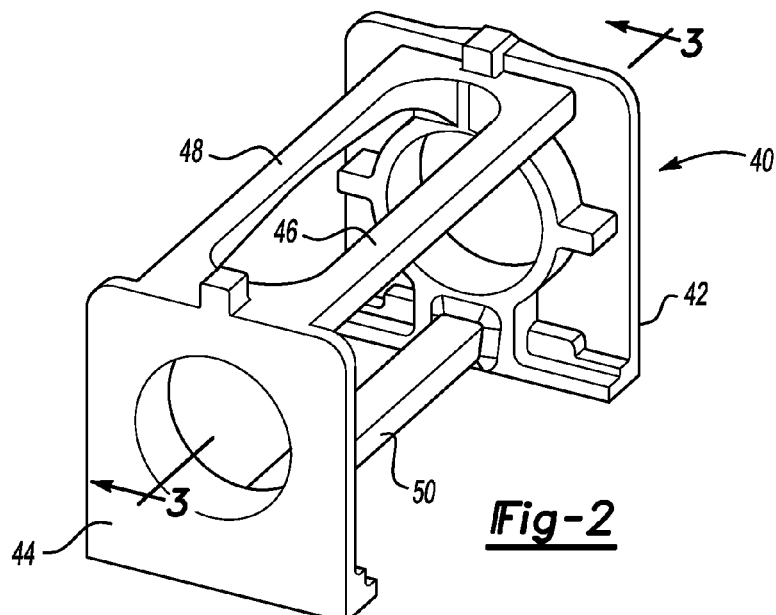
FIG. 2 is a perspective illustration of an example elevator machine frame.

FIG. 1 schematically shows selected portions of an elevator system 20. An elevator car 22 is associated with a counterweight 24 by a roping assembly 26. Although FIG. 1 shows a 1:1 roping arrangement, the present invention can be used with any desired roping arrangement. A machine assembly 30 causes desired movement of the roping assembly 26 to control the movement and position of the elevator car 22.

The machine assembly 30 includes a motor 32, a brake 34 and a traction sheave 36. The motor 32 and brake 34 control movement of the traction sheave 36 about an axis of rotation 38 to control movement of the roping assembly 26 and the elevator car 22. A machine frame 40 supports the motor 32, brake 34 and traction sheave 36. In one example, the machine frame 40 is configured to be mounted inside a hoistway in a machine roomless elevator system. The traction sheave 36 could be secured to or, as shown in the Figures, part of the motor shaft.

FIGS. 2-5 show one example machine frame 40 that has a configuration that is designed to reduce an amount of noise potentially radiated from the frame. In this example, the machine frame 40 includes support surfaces 42 and 44. In this particular example, one of the support surfaces 42, 44 is configured to support the motor 32 and the other is configured to support the brake 34. A plurality of arms 46, 48 and 50 maintain a desired spacing and alignment of the support surfaces 42, 44 relative to each other.

One of the noise reducing features of this example is configuration of the arms. At least one of the arms 46, 48, 50 has a different cross section at different longitudinal locations along the length of the arm. In other words, at least one of the arms 46, 48, 50 has a variable cross section along its length. The different cross sections reduce any tendency for the arm to radiate noise by altering the vibration profile and amplitude along the length of the arm, which reduces the tendency for the arm to radiate a tonal noise that could be heard by an individual.

Figure 4:
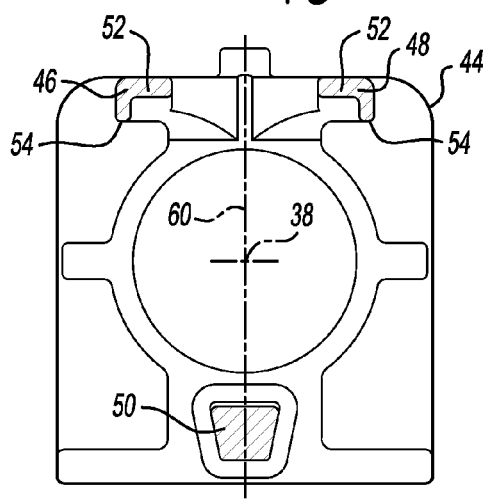
FIG. 4 is a cross sectional illustration taken along the lines 4-4 in FIG. 3.

FIG. 4 shows a first cross section of the arms 46, 48 and 50 taken at a first longitudinal location along the arms (i.e., a first location between the support surfaces 42 and 44). As can be appreciated from the drawings, the cross section is taken transverse to a longitudinal direction along the arms. In this example, the longitudinal direction of the arms is parallel to the axis of rotation 38 of the traction sheave 36. At this first location, which corresponds to a midpoint along the length of the arms, the cross section of the arms 46 and 48 has a generally L-shaped configuration with the thickness of the two portions 52, 54 of the "L" being approximately equal.

Figure 5:
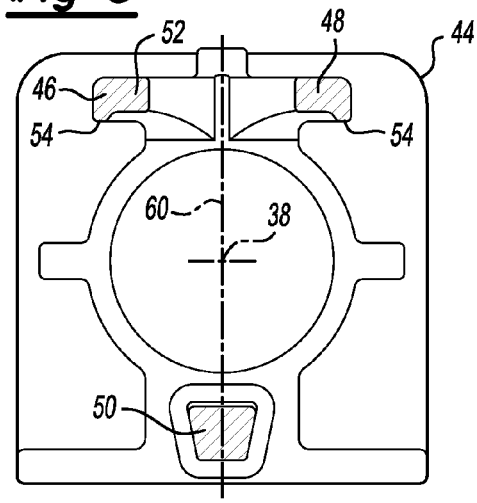
FIG. 5 is a cross sectional illustration taken along the lines 5-5 in FIG. 3.

A second cross section of the arms 46, 48 and 50 taken at a second, different longitudinal location along the arms is shown in FIG. 5. In this example, the second location is spaced away from the support surfaces 42, 44. At this second location, the cross section is generally L-shaped but is different from the first cross section, at least in part, because one portion of the "L" is thicker than the other. One portion 52 is thicker than the other portion 54.

Figure 3:
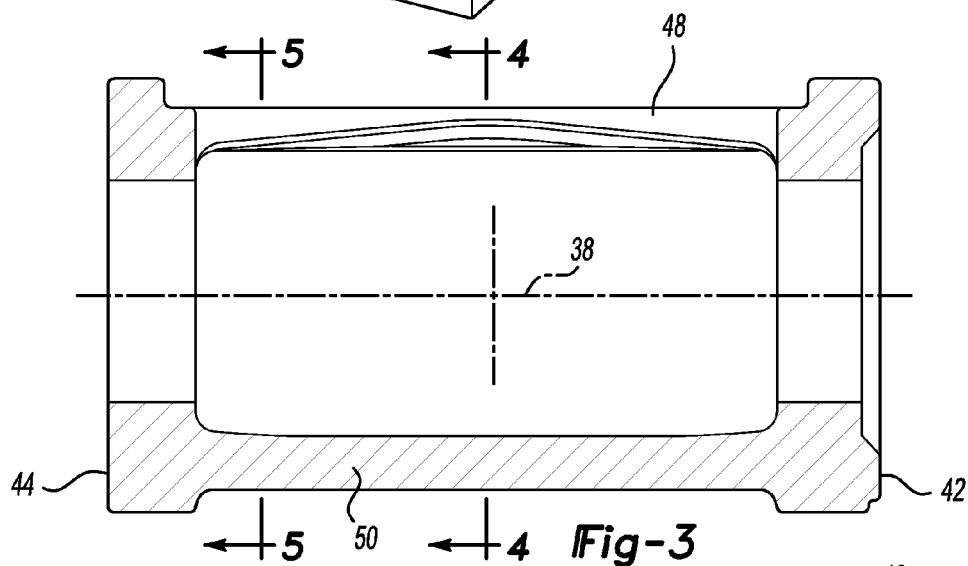
FIG. 3 is a cross sectional illustration taken along the lines 3-3 in FIG. 2.

As can best be appreciated from FIG. 3, the cross section of the arms 46 and 48 gradually changes along the length of the arms. In other words, the arms 46 and 48 have a continuously variable cross section along their lengths. In this example, the cross section is smallest near a middle of the length of the arms. In this example, the shape of the first cross section is different than the shape of the second cross section. The first cross section also has a different cross-sectional dimension than the second cross section in this example. Alternatively, the arms 46 and 48 could have discretely variable cross sections along their lengths.

As can be appreciated in FIGS. 4 and 5, the arm 50 has a generally trapezoidal shaped cross section. That is a different shape than that of the arms 46 and 48. In this example, two of the arms have matching cross sectional profiles along their lengths and the third arm is different in shape. Another feature of the arm 50 in this example is that the cross section is the same at the first and second longitudinal locations. In this example, only two of the arms have a different cross section at different longitudinal locations. In other examples, all three arms have different cross sections at different longitudinal locations. In still other examples, only one of the arms has different cross sections at different longitudinal locations.

Another feature of the example of FIGS. 2-5 is how the arms 46, 48 and 50 are arranged relative to each other and the traction sheave axis of rotation 38. In this example, one of the arms is below the axis 38 and at least partially in a vertical plane 60 that contains the axis 38. In this example, the plane 60 is through a center of the arm 50. In such an example, the arm 50 is between the portions of the ropes or belts of the roping assembly 26 that are adjacent the traction sheave 36 when the machine frame 40 is near a top of a hoistway and the arm 50 is vertically below the traction sheave 36.

The arms 46 and 48 in this example are on an opposite side of the traction sheave 36 from the arm 50. The arms 46 and 48 are spaced from each other and both are entirely outside of the plane 60 in this example. Such an arrangement including two arms (e.g., 46 and 48) on one side of the traction sheave 36 with one arm (e.g., 50) on an opposite side reduces the noise generating tendencies of the frame 40. The strategic arrangement of the arms reduces vibration; provides a stable frame for adequately supporting the motor 32, brake 34 and traction sheave 36 and associated loads and reduces any tendency to radiate tonal noise. The unequal number of arms on opposite sides of the traction sheave 36 has been demonstrated through computer modeling to reduce noise compared to frame designs having a single arm on each side of the traction sheave 36. One reason for this result is that such an arm arrangement allows for choosing arm shapes that have a desired acoustic profile. For example, a frame having a single arm on the opposite sides of the traction sheave 36 requires larger arms having increased surface area that tend to radiate more noise compared to the three arm configuration with one centered arm on one side and two spaced arms on an opposite side of the traction sheave 36.

Either or both of the noise-reducing features may be included in a machine frame designed according to the principles of this description. The varied cross section of at least one arm may be used as the sole noise reducing feature or may be used in an example that includes two arms on one side of a traction sheave with a single arm on an opposite side. Similarly, two arms on one side of the traction sheave may be used as the sole noise reducing feature or at least one such arm may have a different cross section at different longitudinal locations along the arm. Those skilled in the art who have the benefit of this description will realize how to configure a machine frame that achieves the noise reducing benefits of the disclosed examples and meets the needs of their particular situation.

Figure 6:
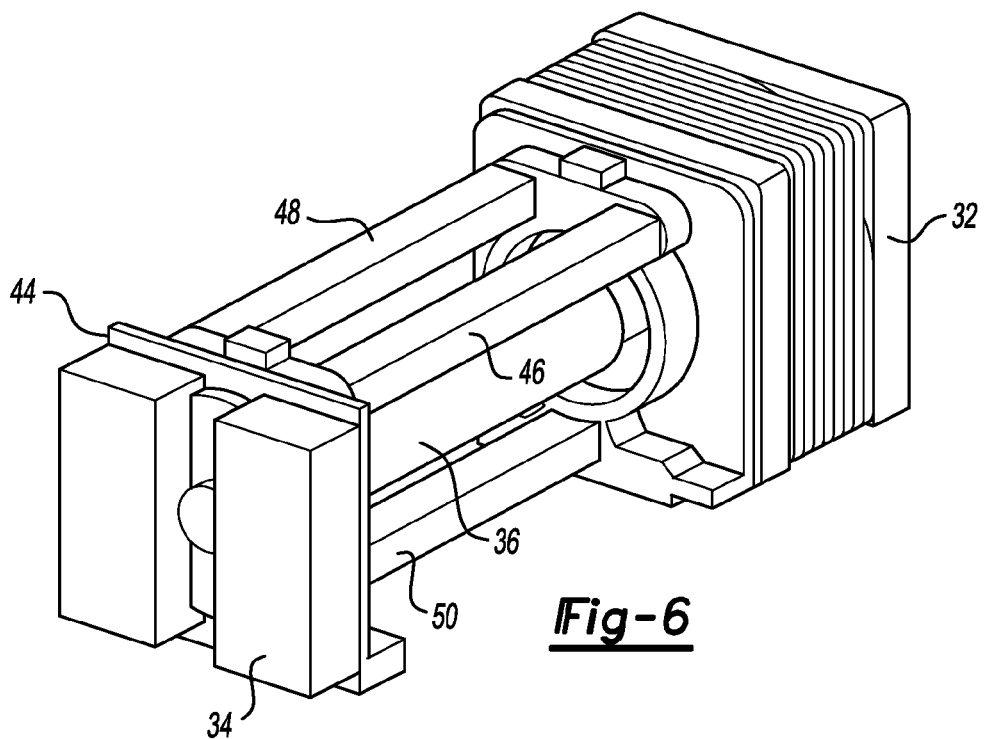
FIG. 6 is a perspective illustration of another example machine frame.

FIG. 6 shows another example machine frame 40. In this example, all three arms 46, 48 and 50 have the same cross section and their cross sections are the same along their entire length. In this example, the arms have a generally rectangular cross section. This is one example use of the strategic arrangement of arm locations on opposite sides of the traction sheave 36 as the sole noise reducing feature.

Figure 7:
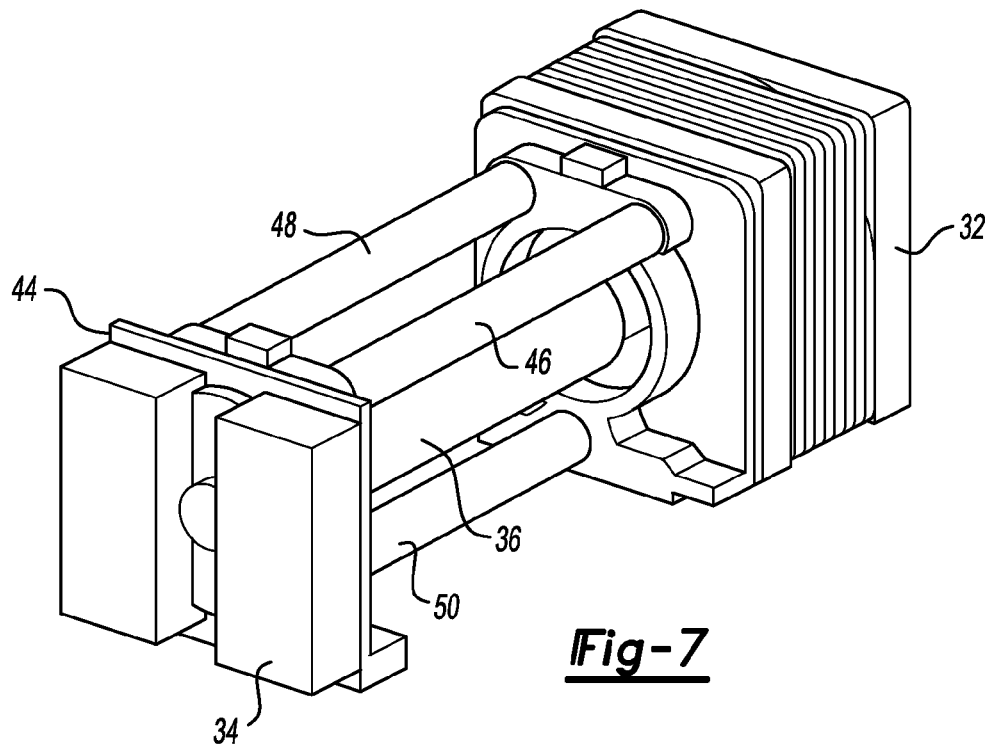
FIG. 7 is a perspective illustration of another example machine frame.

Another example machine frame 40 is shown in FIG. 7. In this example, all three arms 46, 48 and 50 have a round cross section. The cross section of all three arms remains the same along their length in this example.

Figure 8:
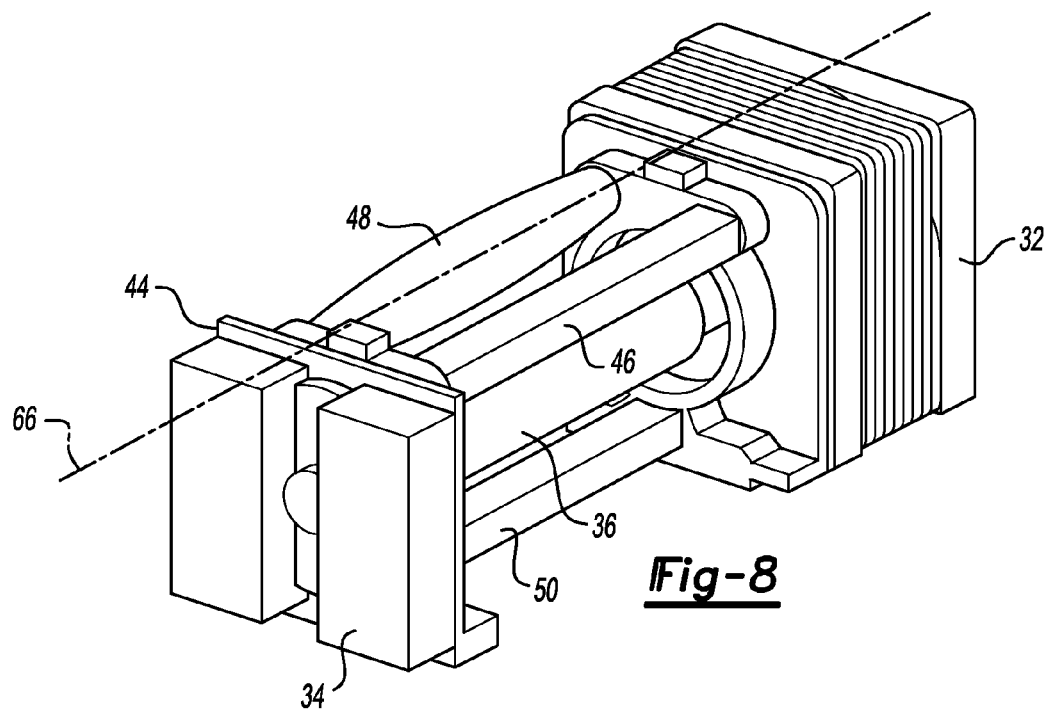
FIG. 8 is a perspective illustration of another example machine frame.

FIG. 8 shows another example machine frame 40. In this example, the arm 48 has a round cross section, the arm 46 has a generally rectangular cross section and the arm 50 has a generally trapezoidal cross section. The arm 48 in this example has a varying cross section along its longitudinal length. In this example, the cross section of the arm 48 is largest near the middle of the arm. In one such example, the cross sectional dimension varies uniformly all around the longitudinal axis 66 of the arm 48 so that the cross section is generally circular at all longitudinal locations along the arm 48. In another example, the cross sectional dimension does not vary uniformly about the axis 66 of the arm 48 so that at least some locations have a generally oval cross section.

Figure 9:
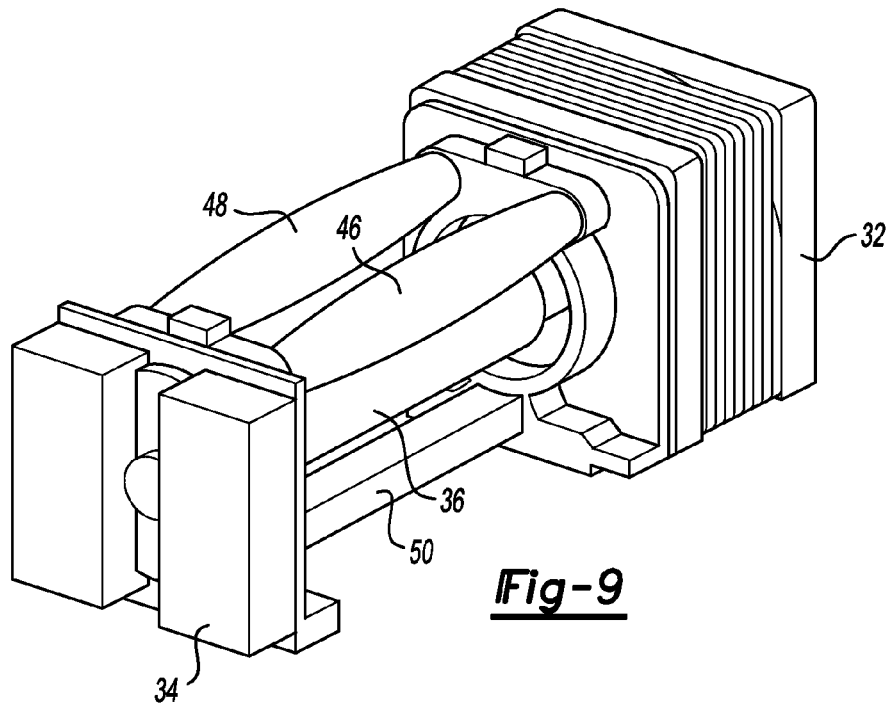
FIG. 9 is a perspective illustration of another example machine frame.

Another example is shown in FIG. 9. This example machine frame 40 includes matching arms 46 and 48, each of which has a round cross section that varies along a length of the arm. The arm 50 has a generally trapezoidal cross section that does not vary along its length.

The shape of the arms 46, 48 and 50 and the configuration of the support surfaces 42 and 44 are selected in one example to facilitate casting the entire frame 40 out of metal. The example designs are easier to cast or otherwise manufacture such that they also provide economic advantages compared to other, noisier frame designs.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:
1. An elevator machine frame, comprising:
    a plurality of support surfaces configured to support at least one of a motor or a brake;

a plurality of arms between the support surfaces and maintaining a desired alignment of the support surfaces, at least one of the arms having
a first cross section taken transverse to a longitudinal direction along a length of the at least one arm at a first longitudinal location on the at least one arm and
a second, different cross section at a second, different longitudinal location on the at least one arm;
wherein the first and second cross sections are taken at the same angle relative to the longitudinal direction; and
wherein the cross section of the at least one arm progressively varies between the first second locations.

2. The elevator machine frame of claim 1, wherein the first cross section has a different shape than the second cross section.

3. The elevator machine frame of claim 1, wherein the first cross section has a different cross-sectional dimension than the second cross section.

4. The elevator machine frame of claim 3, wherein the first cross section has a different shape and a different size than the second cross section.

5. The elevator machine frame of claim 1, wherein the first location is at a longitudinal middle of the at least one arm and the first cross section is a smallest cross section of the at least one arm.

6. The elevator machine frame of claim 1, wherein at least the first cross section is generally L-shaped.

7. The elevator machine frame of claim 1, wherein two of the arms are spaced apart and near one edge of the support surfaces and a third one of the arms is near an opposite edge of the support surfaces and aligned with a center of the spacing between the two of the arms.

8. The elevator machine frame of claim 1, wherein at least one of the arms has a different exterior profile than the other arms.

9. An elevator machine frame comprising:
support surfaces configured to support at least one of a motor or a brake associated with a traction sheave; and
a plurality of arms between the support surfaces longitudinally parallel with an axis of rotation of the traction sheave, one of the arms being positioned on one side of the traction sheave and at least partially in a vertical plane that includes the axis of rotation, two others of the arms being positioned on an opposite side of the traction sheave from the one side, the two other arms being spaced apart so that the two other arms are outside of the vertical plane, wherein the cross section of the at least one arm progressively varies between the first and second locations.

10. The elevator machine frame of claim 9, wherein at least one of the arms includes a first cross section taken transverse to a longitudinal direction along a length of the at least one arm at a first longitudinal location on the at least one arm and a second, different cross section at a second, different longitudinal location on the at least one arm.

11. The elevator machine frame of claim 10, wherein the first cross section has a different shape than the second cross section.

12. The elevator machine frame of claim 10, wherein the first cross section has a different cross-sectional dimension than the second cross section.

13. The elevator machine frame of claim 9, wherein at least one of the arms has a different exterior profile than the other arms.

* * * * *